United States Patent [19]

Larik et al.

[11] Patent Number: 5,027,181

[45] Date of Patent: Jun. 25, 1991

[54] CIRCUIT CONFIGURATION FOR PROTECTING AN ELECTRONIC CIRCUIT AGAINST OVERLOAD

[75] Inventors: Joost Larik, Nürnberg; Walter Förder, Fürth/Bay, both of Fed. Rep. of Germany

[73] Assignee: Siemens Aktiengesellschaft, Munich, Fed. Rep. of Germany

[21] Appl. No.: 535,367

[22] Filed: Jun. 8, 1990

[30] Foreign Application Priority Data

Jun. 8, 1989 [EP] European Pat. Off. ........ 89110405.1

[51] Int. Cl.[5] ............... H01L 27/02; H01L 29/06; H02H 9/00; H03B 1/04
[52] U.S. Cl. ............................. 357/41; 357/22; 357/23.13; 357/13; 361/56; 307/542
[58] Field of Search .............. 357/41, 22, 23.13, 13; 361/56, 91; 307/542, 549, 550

[56] References Cited

U.S. PATENT DOCUMENTS 3,769,561  10/1973  White et al. .................... 357/43

FOREIGN PATENT DOCUMENTS 1538376  7/1969  Fed. Rep. of Germany .
2460422  6/1976  Fed. Rep. of Germany .
57-71180  5/1982  Japan ........................ 357/23.13

Primary Examiner—Mark Prenty
Attorney, Agent, or Firm—Herbert L. Lerner; Laurence A. Greenberg

[57] ABSTRACT

A circuit configuration for protecting electronic circuits against overload of a supply voltage source includes a voltage-limiting configuration, such as a Zener diode. A depletion layer field effect transistor is connected upstream of the voltage-limiting configuration and has interconnected gate and source terminals.

8 Claims, 2 Drawing Sheets

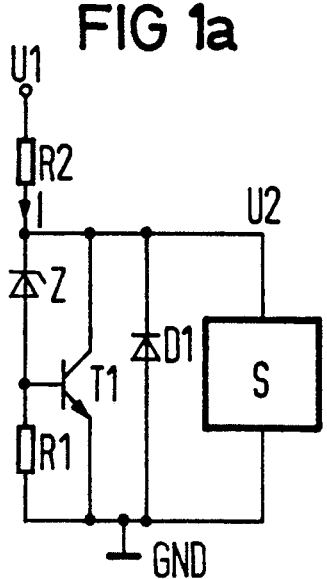
FIG 1a
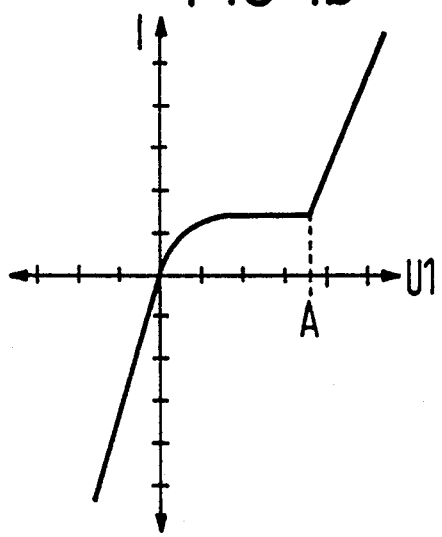
FIG 1b
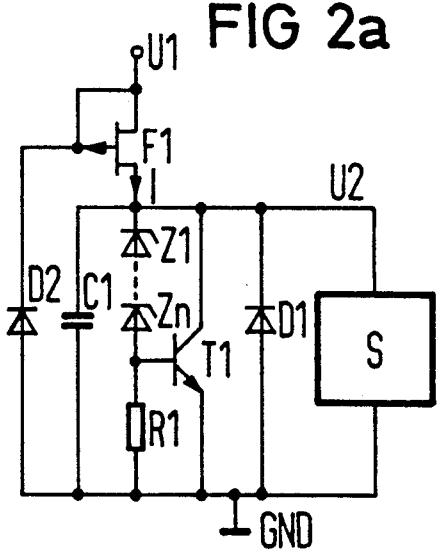
FIG 2a
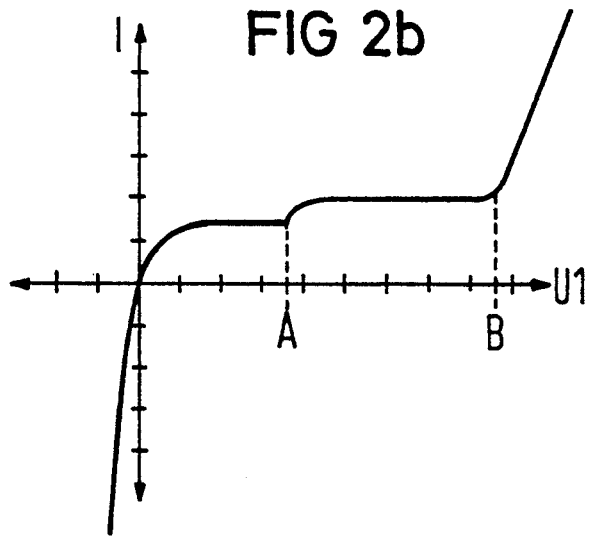
FIG 2b
FIG 4
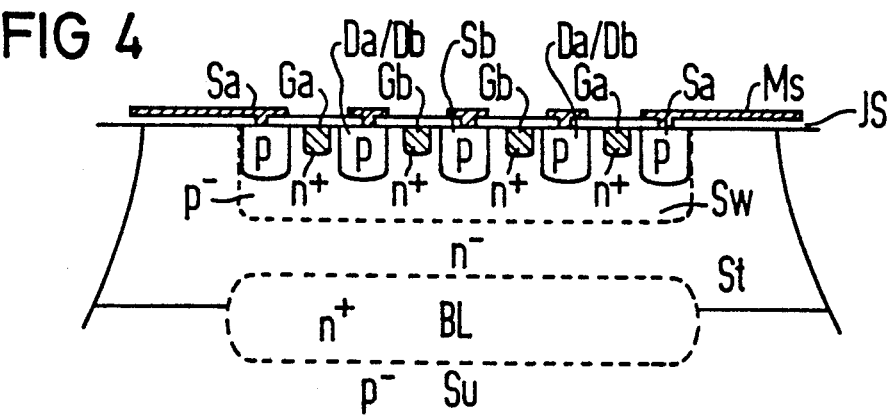

CIRCUIT CONFIGURATION FOR PROTECTING AN ELECTRONIC CIRCUIT AGAINST OVERLOAD

The invention relates to a circuit configuration on for protecting an electronic circuit against overload of a supply voltage source with a voltage-limiting configuration, for instance a Zener diode Electronic circuits, particularly integrated circuits, are often exposed to the danger of destruction from overloads present on the supply lines, for instance when they are used in on-board electrical systems in automobiles. Voltage-limiting configurations are therefore connected to the input side of the electronic circuits. Such a configuration is known, for instance, from the article by Robert C. Dobkin, entitled "IC Zener Eases Reference Design", in National Semiconductor Application Note 173, November 1976, which will be more fully discussed below in connection with the description of the drawings.

The disadvantage of the known circuit configuration is that in certain cases the power loss increases sharply, and thus destruction of the circuit configuration itself can occur.

It is accordingly an object of the invention to provide a circuit configuration for protecting an electronic circuit against overload, which overcomes the hereinafore-mentioned disadvantages of the heretofore-known devices of this general type and has improved power limitation.

With the foregoing and other objects in view there is provided, in accordance with the invention, a circuit configuration for protecting electronic circuits against overload of a supply voltage source, comprising a voltage-limiting configuration, such as a Zener diode, and a first depletion layer field effect transistor being connected upstream of the voltage-limiting configuration and having interconnected gate and source terminals.

In accordance with another feature of the invention, the first depletion layer field effect transistor is split into first and second subtransistors of the same conduction type having gate, source and drain terminals, the gate and source terminals of the second subtransistor being connected to the gate terminal of the first subtransistor, and the drain terminals of the subtransistors being interconnected.

In accordance with a further feature of the invention, there is provided at least one other depletion layer field effect transistor, the depletion layer field effect transistors being connected in series.

In accordance with an added feature of the invention, there is provided an MOS field effect transistor having a source terminal connected to ground and gate and drain terminals connected to the supply voltage source.

In accordance with an additional feature of the invention, there is provided a semiconductor layer of a first conduction type having a well of a second conduction type formed therein and having a surface, the depletion layer field effect transistor being split into first and second subtransistors integrated into the semiconductor layer along with the MOS field effect transistor, a centrally disposed structure and two striated or stripline structures of the second conduction type being more strongly doped than the well and being disposed in the well, striated or stripline structures of the first conduction type being more strongly doped and each being disposed between one of the striated or stripline structures of the second conduction type and the centrally disposed structure, an insulation layer on the surface having recesses formed therein above the centrally disposed structure and the striated or stripline structures of the second conduction type, and a metallizing layer on the insulation layer corresponding to the course of the striated or stripline structures and the centrally disposed structure, the metallizing layer extending into the recesses in the insulation layer as far as the structures, and having an outermost ring extending past the well and past the semiconductor layer.

In accordance with a concomitant feature of the invention, the circuit configuration is jointly integrated with the circuit to be protected.

The advantages of the invention are a lower expense for circuitry, its suitability for large-scale integration, and a current limitation extending over a wider range of input voltage.

Other features which are considered as characteristic for the invention are set forth in the appended claims.

Although the invention is illustrated and described herein as embodied in a circuit configuration for protecting an electronic circuit against overload, it is nevertheless not intended to be limited to the details shown, since various modifications and structural changes may be made therein without departing from the spirit of the invention and within the scope and range of equivalents of the claims.

The construction and method operation of the invention, however, together with additional objects and advantages thereof will be best understood from the following description of specific embodiments when read in connection with the accompanying drawings.

FIG. 1a is a schematic and block circuit diagram of a known circuit configuration;

FIG. 1b is a graph of the current/voltage dependency of the circuit configuration of FIG. 1a;

FIG. 2a is a schematic and block circuit diagram of a first embodiment of a circuit configuration according to the invention;

FIG. 2b is a graph of the current/voltage dependency of the circuit configuration of FIG. 2a;

FIG. 3b is a graph of the current/voltage dependency of the circuit configuration of FIG. 3a; and FIG. 4 is a diagrammatic, cross-sectional view of an exemplary embodiment of a split field effect transistor and an MOS field effect transistor.

Figure 3A:
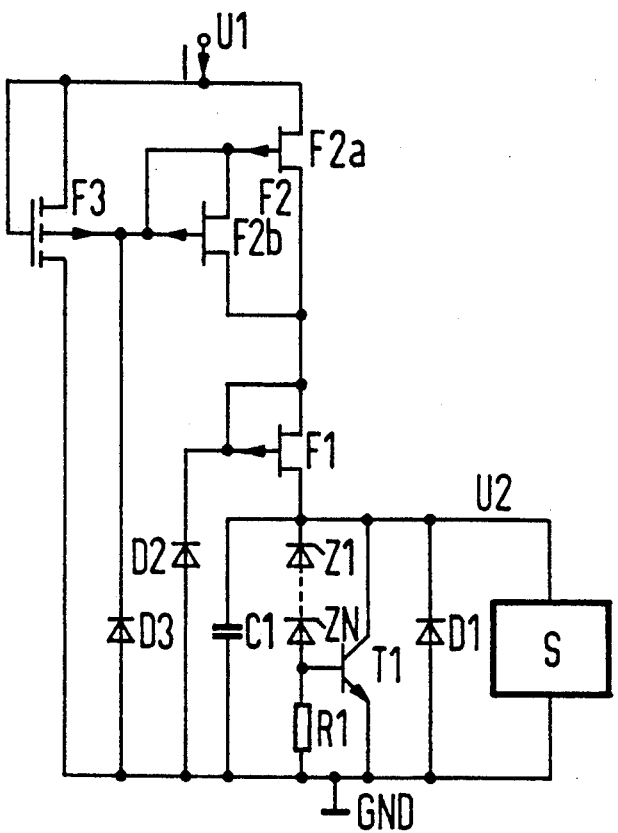
FIG. 3a is a view similar to FIG. 2a of a second embodiment of a circuit configuration according to the invention, having a split field effect transistor.

Referring now in detail to the figures of the drawing, in which identical elements are provided with the same reference numerals, and first, particularly, to FIG. 1a thereof, there is seen a known circuit configuration in which a supply voltage source having a voltage U1 being referred to ground GND is carried through a resistor R1 to the collector of a bipolar transistor T1. The emitter side of the transistor T1 is connected to ground GND and its base is connected to the emitter and through a Zener diode Z to the collector. A voltage U2 for supplying the circuit S to be protected is applied between ground GND and the collector of the transistor T1. A (parasitic) diode D1 is also connected between the emitter and the collector of the transistor T1.

Through the use of the Zener diode Z, the transistor T1 and the resistor R1, the voltage U2 for supplying the circuit to be protected is limited to a value that is approximately the product of the voltage dropping across the Zener diode Z. A resistor R2 is used for current limitation. In the operating range of the circuit to be protected, in other words in the case illustrated, when the voltage U1 is positive and less than the Zener voltage, the protective circuit cannot limit the current consumption of the circuit S to be protected. From this it can be concluded that the resistor R2 must be selected to be correspondingly small. Outside the operating range, or in this case when the voltage U1 is negative or greater than the Zener voltage, the current and voltage should be limited in such a way that the components of the circuit S to be protected are still operated within their allowable operating range, otherwise destruction of the circuit S to be protected would ensue.

FIG. 1b of the drawing shows the course of the current I of the circuit configuration as a function of the voltage U1. With a positive voltage U1, the current consumption initially only gradually increases, until the voltage U1 is approximately equal to the Zener voltage (point A), but upon a further increase in the voltage U1, the current consumption increases sharply. This is also true for the range of polarization, in this case with a negative voltage U1.

As mentioned above, the disadvantage of the known circuit configuration is that in the last two cases mentioned above the power loss increases sharply, and thus destruction of the circuit configuration itself can occur.

The known circuit configuration of FIG. 1a is modified according to the invention by replacing the protective resistor R2 with a depletion layer field effect transistor F1, which is a small p-channel depletion layer field effect transistor in the illustrated exemplary embodiment. Moreover, the configuration of FIG. 2a, like those that follow it, is integrated with the circuit to be protected. The field effect transistor F1 is operated as a current source by interconnecting the source and gate terminals The positive voltage U1 is applied to the source terminal, and the positive voltage U2 is applied to the drain terminal The drain terminal of the field effect transistor F1 is also connected to ground GND in the blocking direction through a parasitic diode D2. The diode D2 is the parasitic substrate diode of the field effect transistor F1. As compared with FIG. 1a, the exemplary embodiment of FIG. 2a is also expanded by adding a capacitor C1, which is located between the drain terminal of the field effect transistor F1 and ground GND. The capacitor C1 forms a low-pass filter for suppressing high-frequency noise pulses together with the track resistance of the drain-to-source path of the field effect transistor F1. Moreover, the Zener diode Z of FIG. 1a is replaced by a series circuit of a plurality of Zener diodes Z1 . . . Zn.

For voltages that are greater than the voltage at the point A, the fact that the field effect transistor F1, instead of the resistor R2, is connected to to the input side, causes the current I to initially rise somewhat and then remain impressed at that value until a point B, which characterizes the breakdown voltage of the field effect transistor F1. If the voltage U1 is greater than the voltage at the point B, then the current I increases sharply, and no further current impression exists.

In the event that the voltage U1 is negative, in other words with polarization, the current I flows to ground GND through the diode D2 which is polarized in the conducting direction. Once again, no current impression occurs.

In the embodiment shown in FIG. 3a, the circuit configuration of FIG. 2a is expanded by adding two depletion layer field effect transistors F2a, F2b of the p-channel type of a split field effect transistors F2, and one MOS field effect transistor F3 of the n-channel type. A diode D3 is created from the parasitic substrate diode of the field effect transistor F2. The two field effect transistors F2a, F2b are constructed as split field effect transistors F2. The two field effect transistors F2a, F2b will be referred to below as subtransistors. The drain terminals and the gate terminals of the two subtransistors F2a, F2b are each joined. Moreover, the source terminal of one subtransistor F2b is connected to the gate terminal of the other subtransistor F2a, and the source terminal of the other subtransistor F2a in turn is subjected to the voltage U1. The joined drain terminals of the two subtransistors F2a, F2 are connected to the source and gate terminals of the field effect transistor F1. The coupled gate terminals of the two subtransistors F2a and F2b, which are likewise both of the p-channel type, are firstly connected to ground GND in the blocking direction through the diode D3, and secondly to the substrate terminal of the MOS field effect transistor F3. The drain terminal of the MOS field effect transistor F3 is connected to ground GND, and the gate and source terminals thereof are acted upon by the supply voltage source U1.

Figure 3B:
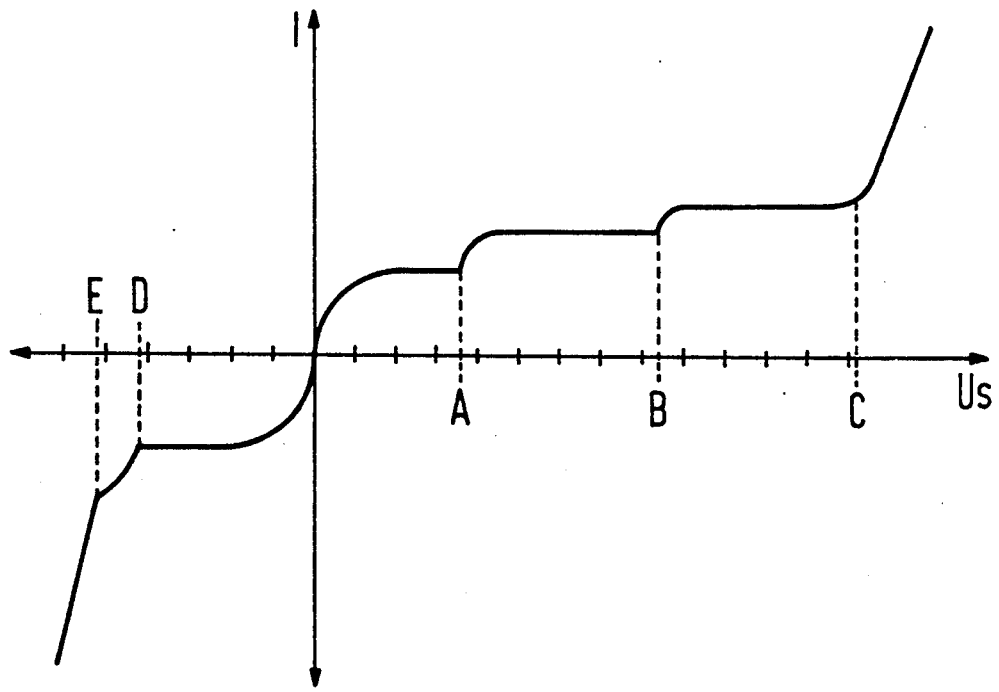

For positive values of the voltage U1, the MOS field effect transistor F3 is inactive. In contrast, the gate-to-source path of the subtransistor F2a is conducting. The subtransistors F2a and F2b can be considered to be connected in parallel. For values of the voltage U1 that are less than the voltage at the point B of FIG. 2b, the function of the entire circuit configuration is essentially the same as that of the configuration of FIG. 2a. However, the series connection of the field effect transistors F1 and F2 achieves a higher breakdown voltage, which is indicated in FIG. 3b at a point C. Beginning at the point B, the current I initially increases slightly and then remains limited up to the point C. By adding further field effect transistors, the breakdown voltage overall can be even further increased. However, in integrating the circuit configuration care must be taken to ensure that the further field effect transistors, like the split field effect transistor F2 and the field effect transistor F1, are electrically insulated or in other words are constructed with separate wells. The voltage occurring at the particular well with respect to ground GND is the same as the applicable gate voltage. The parasitic substrate diodes D1, D2 and D3 that are necessarily present in the integration are blocked, given a positive voltage U1, and determine the maximum attainable breakdown voltage. Accordingly, the point C in FIG. 3b represents the breakdown voltage of the diode D2. For negative values of the voltage U1, the parasitic diodes D1, D2 and D3 become conducting. Therefore, the voltage U2 becomes equal to the voltage flowing across the diode D1. The subtransistor F2b and the field effect transistor F1 are no longer active. However, by splitting the field effect transistor F2 into the subtransistors F2a and F2, the subtransistor F2a becomes polarizable. In this transistor, the source and drain functions are then transposed, and the subtransistor F2a limits the current like a single field effect transistor. As a result, a static polarizability of the circuit configuration is advantageously attained.

At a predetermined negative value of the voltage U1, the MOS field effect transistor F3 which has a threshold voltage that is less than or equal to the gate-to-source breakdown voltage of the subtransistor F2a, also becomes conducting. If the voltage U1 then becomes more negative than the threshold voltage, some of the current I is carried through the MOS field effect transistor F3, which advantageously assures additional protection against negative overloads, in particular voltage peaks. In FIG. 3b of the drawing, the threshold voltage is equivalent to a point D. Beginning at the zero point of the current I and the voltage U1, the current initially increases in the negative direction, until it remains limited at a predetermined value. At the point D, the current then increases in proportion to the voltage U1 up to a point E, at which the increase then becomes steeper. A point E characterizes the voltage that leads to a breakdown of the subtransistor F2a despite the action of the MOS field effect transistor F3.

A preferred embodiment of the MOS field effect transistor F3 and of the field effect transistor F2 split into the subtransistors F2a and F2 is shown in FIG. 4.

A preferred embodiment of the split field effect transistor F2 that is made by integrated circuit technology is shown in FIG. 4. A layer St is provided above a substrate layer Su of the p⁻-conduction type, and a buried layer BL of the n⁺-conduction type is embedded between the layers Su and layer St. A well Sw of the p⁻-conduction type is in turn incorporated into the layer St. Disposed in the well Sw (in the illustrated exemplary embodiment) are a centrally disposed structure Sb and two annular striated or stripline structures Sa, Da/Db of the p-conduction type, which are concentric with the structure Sb. Between these structures Sa, Da/Db are two likewise annular, striated or stripline structures Ga, Gb of the n⁺-conduction type. An insulation layer Js is provided on the surface and recesses are provided in the insulation layer at locations beneath which the structures Sa, Da/Db, Sb are located. A likewise annular metallizing layer Ms is disposed on the insulation Js corresponding to the recesses therein. The metallizing layer corresponds to the course, extent or size of the structures Sa, Da/Db, Sb and extends as far as the various structures in the recesses of the insulation layer Js. The outermost ring of the metallizing layer Ms extends as far as the edge of the entire configuration.

The configuration of FIG. 4 basically involves two parallelconnected field effect transistors. The source terminal of the subtransistor F2 is located on the outside in the form of the structure Sa. Overlapping the metallizing of the structure Sa with the insulation layer Js in combination with the layer St forms an MOS field effect transistor, which is advantageously provided as the MOS field effect transistor F3 in the circuit configuration according to the invention. Furthermore, the annular gate terminals of the subtransistors F2a and F2b, which are provided by the structures Ga, Gb and, for instance, are constructed by emitter diffusion, are joined to one another and to the layer St as well as to the buried layer BL. The structures Ga and Gb (channel stoppers) separate the layer St which acts as a channel, from the structure Da/Db acting as a drain terminal of the two subtransistors F2a and F2b. The structures Sa, Sb, Da/Db are, for instance, made by base diffusion. By varying the location of the structures Ga and Gb relative to one another with a given location of the structures Sa, Sb, Da/Db, the course of the current I can be varied as a function of the voltage U1, particularly in the vicinity of the point E.

The advantages of the configuration shown in FIG. 4 are the small amount of space it requires, the shielding properties of the metallizing layer, and the adaptation of the breakdown voltage of the field effect transistor F2 and the threshold voltage of the MOS field effect transistor F2.

In closing, it should be noted that a Zener diode alone can be used, instead of the known configuration having a Zener diode Z, a transistor T1 and a resistor R1.

We claim:

1. Circuit configuration for protecting electronic circuits against overload of a supply voltage source, comprising a voltage-limiting configuration, and a depletion layer field effect transistor having a drain terminal and interconnected gate and source terminals, said drain terminal being connected to said voltage limiting configuration and said interconnected gate and source terminal being connected to the supply voltage source.

2. Circuit configuration according to claim 1, wherein said voltage-limiting configuration is a Zener diode.

3. Circuit configuration according to claim 1, wherein said depletion layer field effect transistor is split into first and second subtransistors of the same conductivity type having gate, source and drain terminals, the gate and source terminals of said second subtransistor being connected to the gate terminal of said first subtransistor, and the drain terminals of said first and second subtransistors being interconnected.

4. Circuit configuration according to claim 1, including at least one additional depletion layer field effect transistor, said additional depletion layer field effect transistor being connected in series with said depletion layer field effect transistor.

5. Circuit configuration according to claim 1, including an MOS field effect transistor having a drain terminal connected to ground and gate and source terminals connected to the supply voltage source.

6. Circuit configuration according to claim 5, including a semiconductor layer of a first conductivity type having a well of a second conductivity type formed therein and having a surface,
  said depletion layer field effect transistor being split into first and second subtransistors integrated into said semiconductor layer along with said MOS field effect transistor,
  a centrally disposed structure and two striated structures of the second conductivity type being more strongly doped than said well and being disposed in said well,
  striated structures of the first conductivity type being more strongly doped than said semiconductor layer and each of said striated structures of the first conductivity type being disposed between one of said striated structures of the second conductivity type and said centrally disposed structure,
  an insulation layer on said surface having recesses formed therein above said centrally disposed structure and said striated structures of the second conductivity type, and
  a metallization layer of said insulation layer corresponding to the course of said striated structures of the second conductivity type and said centrally disposed structure, said metallization layer extending into said recesses in said insulation layer as far as said centrally disposed structures and said striated structures of the second conductivity type, and having an outermost ring extending past said well and past said semiconductor.

7. Circuit configuration according to claim 6, wherein said first and second subtransistors are of the same conductivity type and have gate, source and drain terminals, the gate and source terminals of said second subtransistor being connected to the gate terminal of said first subtransistor, and the drain terminals of said first and second subtransistors being interconnected.

8. Circuit configuration according to claim 6, wherein the circuit configuration is jointly integrated with the circuit to be protected.

* * * * *